Nov. 22, 1949 E. G. ROEHM ET AL 2,489,227
MILLING MACHINE
Filed Oct. 3, 1942 6 Sheets-Sheet 1

Fig. 1

INVENTOR.
ERWIN G. ROEHM
HANS FRITSCHI
BY Leigh W. Wright.
ATTORNEY.

INVENTOR.
ERWIN G. ROEHM
HANS FRITSCHI
BY Leigh W. Wright
ATTORNEY

Nov. 22, 1949 E. G. ROEHM ET AL 2,489,227
MILLING MACHINE
Filed Oct. 3, 1942 6 Sheets-Sheet 6

INVENTOR.
ERWIN G. ROEHM
HANS FRITSCHI
BY Leigh W. Wright
ATTORNEY

Patented Nov. 22, 1949

2,489,227

UNITED STATES PATENT OFFICE 2,489,227

MILLING MACHINE

Erwin G. Roehm, Norwood, and Hans Fritschi, Silverton, Ohio, assignors to The Cincinnati Milling Machine Co., Cincinnati, Ohio, a corporation of Ohio Application October 3, 1942, Serial No. 460,706

31 Claims. (Cl. 90—21)

This invention relates to machine tools and more particularly to improvements in milling machines.

One of the objects of this invention is to provide an improved automatic milling machine which may be selectively controlled to provide fast, slow or automatically variable feed rates and automatic separation between cutter and work after a milling operation.

Another object of this invention is to provide an improved variable feed transmission for a milling machine which will produce a constant feeding rate between the cutter and work.

A further object of this invention is to provide improved means for automatically adjusting and maintaining a selected feed rate constant and which may be utilized as part of a variable feed control.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts.

Figure 1:
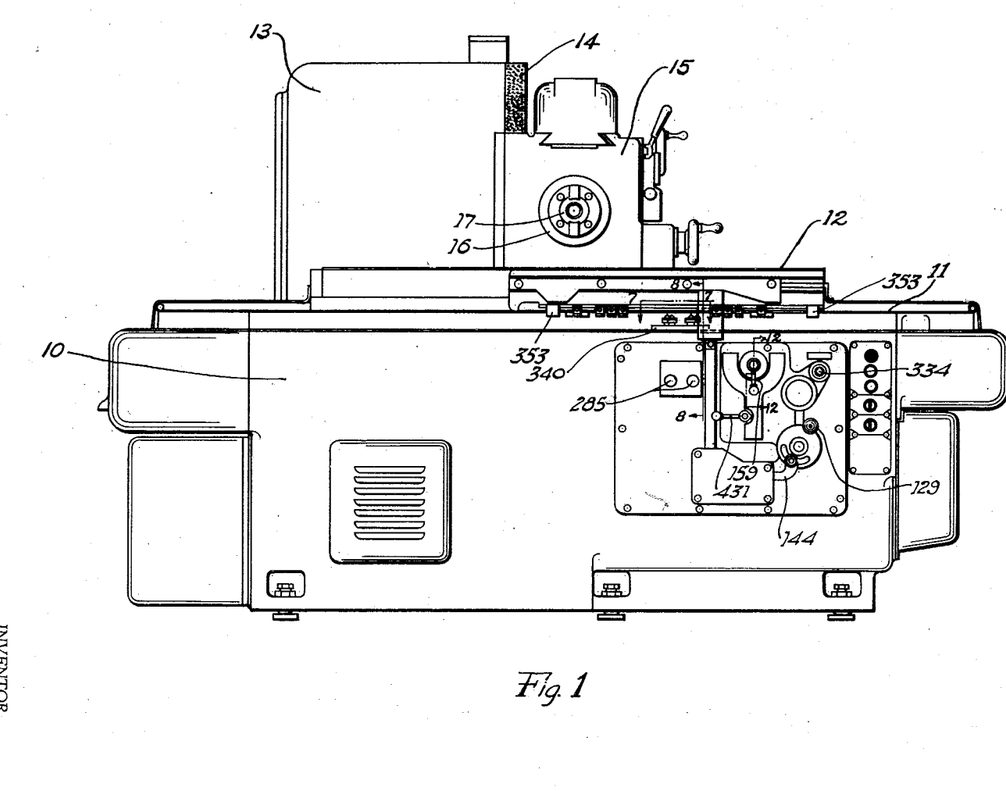
Figure 1 is a front elevation of a machine tool embodying the principles of this invention.

Referring to the drawings, Figure 1 shows a front view of a machine embodying this invention and from this figure it will be noted that the machine is of the bed type comprising a bed 10 upon the top of which is formed guideways 11 which support a table 12 for horizontal movement; and a column or headstock 13 which is integrally connected to the bed and provided with guideways 14 formed on one face thereof for receiving a spindle carrier 15 which is vertically movable with respect to the top of the table 12.

Briefly, the spindle carrier has a quill 16 which is slidably mounted in the carrier for horizontal adjustment and a cutter spindle 17 is journaled within the quill for axial movement thereby.

Figure 2:
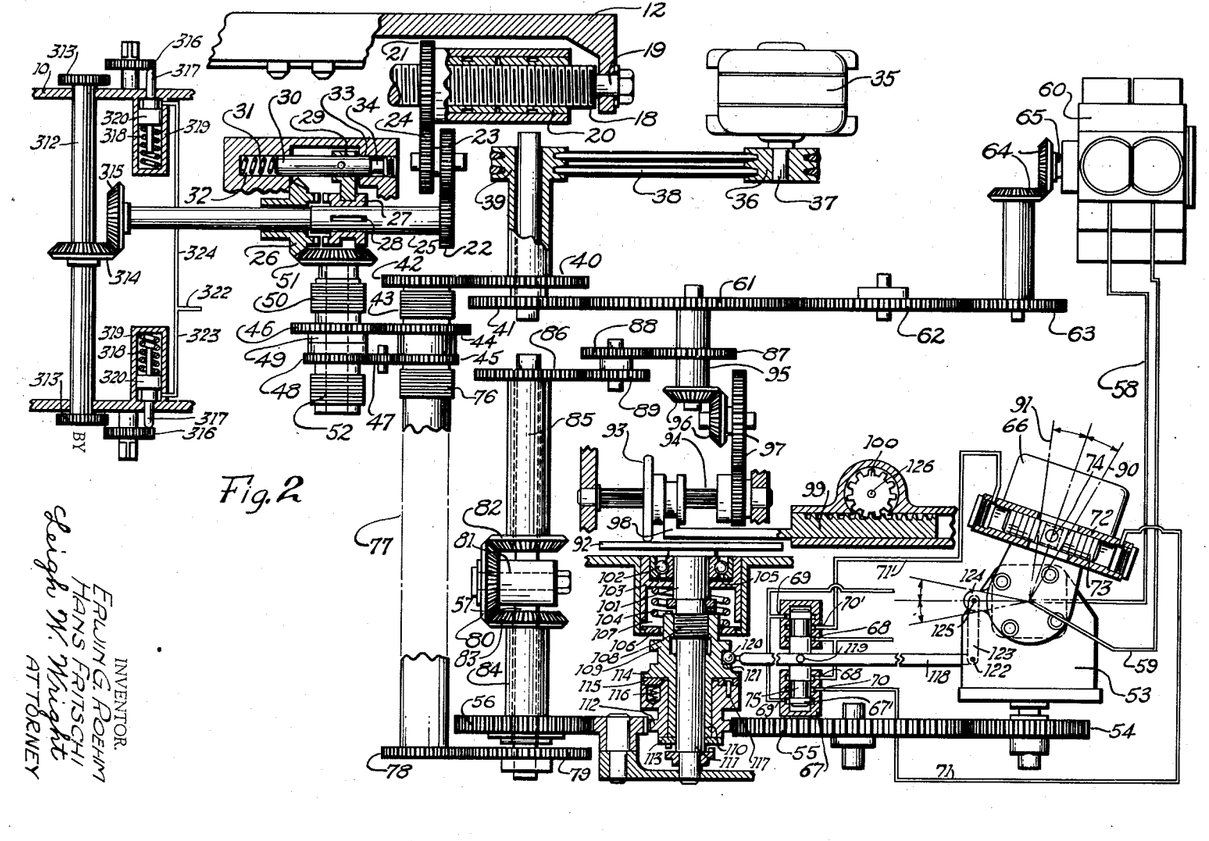
Figure 2 is a diagrammatic view of the table transmission control mechanism.

The transmission mechanism for traversing the table is shown diagrammatically in Figure 2. A table lead screw 18 is fixedly supported against rotation to opposite ends of the table as shown at 19. A rotating nut construction, indicated generally by the reference numeral 20, is anti-frictionally supported in the bed 10 and in surrounding relation to the screw. The nut construction is of the backlash eliminating type, and may be the same as that shown in copending application, Serial No. 405,354, filed in the United States Patent Office on August 4, 1941 now Patent No. 2,320,353, issued June 1, 1943. Since it does not constitute any part of the present invention, detailed description thereof is not believed to be necessary. Suffice it to say that this nut construction has a driving gear 21 which is driven from a gear 22 through a pair of intermediate idler gears 23 and 24, whereby rotation of the nut assembly will effect axial movement of the screw. The gear 22 is integrally attached to a shaft 25 upon which a bevel gear 26 is supported for free rotation. The gear 26 may be power driven and is connectable to the shaft 25 through a shiftable clutch member 27 which is splined at 28 to the shaft 25.

A shifter fork 29 is attached to a slidable plunger 30 which is continuously acted upon by a spring 31 to maintain the clutch out of engagement with the gear.

The plunger 30 is slidably supported in bores 32 and 33 formed in a fixed part of the bed and the plunger 30 is reduced at 34 to form a piston and cylinder to which hydraulic pressure may be admitted to effect shifting of the plunger and consequent engagement of the clutch.

The power for driving the transmission is derived from a prime mover such as an electric motor 35 which has a multiple groove pulley 36 attached to its armature shaft 37. This pulley is connected by multiple V-belts 38 to a driven pulley 39 which is anti-frictionally supported in the bed for driving a pair of gears 40 and 41.

The gear 40 drives directly a gear 42 which may be termed the rapid traverse drive gear. This gear is connectable through clutch means 43 to a gear pair 44 and 45. The gear 44 meshes directly with a gear 46 for driving the same in one direction and the gear 45 is connected through an intermediate idler 47 to a second gear 48 for driving the same in an opposite direction with respect to the gear 46, the two gears 46 and 48 being supported for free rotation on a common shaft 49. The gear 46 may be connected by clutch means 50 for rotation of a beveled gear 51 in one direction, this bevel gear intermeshing with the previously mentioned bevel gear 26. The gear 48 may be operatively connected through clutch means 52 for rotation of bevel gear 51 in the other direction whereby the bevel gear 26 may be rotated in opposite directions to effect reciprocation of the table. It will thus be apparent that the clutches 50 and 52 constitute direction determining clutches while the clutch 43 constitutes a rapid traverse selector clutch.

The feed transmission derives its power from a hydraulically operated motor 53 which has a drive gear 54 that is connected by a gear train 55 to a gear 56 supported for free rotation relative to a supporting shaft 57. The hydraulic motor is supplied with operating fluid through a pair of channels 58 and 59 by a hydraulic pump 60 that is driven by the prime mover 35. In other words, a gear train comprising a gear 61 which intermeshes with the gear 41 and spur gears 62 and 63 connect the gear 41 through a pair of bevel gears 64 to the pump drive shaft 65. It will now be seen that the pump 60 is continuously driven by the electric motor 35 at a constant rate and that the pump in turn effects continuous operation of the hydraulic motor 53 and thereby of the gear 56.

The hydraulic motor 53 is a variable displacement motor which may be of the wobble plate type such as that shown in patent to Thoma, No. 1,931,969, having an angularly adjustable cylinder block 66 for varying its displacement and thereby its speed. The angular position of the cylinder block is controlled by a displacement control valve 67 having pressure ports 68, exhaust ports 69, and intermediate ports 70 and 70' which are connected by channels 71 and 71' respectively to a fixed cylinder 72 containing a piston 73 that is connected to the block by a pin 74. The valve plunger 67' has annular grooves 75 which are of such width that the pressure and exhaust ports are closed when the plunger is in a central position. If the valve plunger is moved upward as viewed in Figure 2, pressure is admitted to the line 71, causing decrease in motor displacement equivalent to increase in speed, while if the valve plunger is moved downward pressure is admitted to line 71' causing increase in motor displacement and decrease in speed. By means of this valve the displacement of the motor may be varied and thereby the speed of rotation of the gear 56.

The gears 44 and 45 which, as previously described, may be driven at a rapid traverse rate by engagement of the rapid traverse clutch 43 may also be driven at a variable feed rate upon engagement of a feed clutch 76 which serves to operatively connect these gears to a shaft 77 having a gear 78 which intermeshes with a gear 79 attached to the end of shaft 57. This shaft is driven at variable rates through a differential mechanism comprising a gear 80 which is rotatably mounted on a cross shaft 81 carried by the shaft 57 and a pair of differential gears 82 and 83. The gear 83 is connected to the gear 56 by an intervening sleeve 84 which is supported for free rotation relative to the shaft 57. The gear 82 is connected by a sleeve 85 to a gear 86 which is driven through a branch train from the gear 61 which is continuously driven by the electric motor 35. In other words, the gear 61 is integral with a gear 87 and this gear is connected through intermediate idler gears 88 and 89 to the gear 86. It will now be apparent that the electric motor 35 drives the gear 82 at a constant rate and the gear 83 at a variable rate through the pump-motor combination.

The gearing connections are such that the gears 82 and 83 are rotated in opposite directions with the result that if they both rotate at the same speed there will be no differential action to cause bodily movement of gear 80 in spite of its rotation and therefore the shaft 57 will remain stationary. This is equivalent to zero feed rate of the table.

Variable feed rates are obtained by increasing the rate of rotation of the bevel gear 83 above that of the gear 82 in a stepless fashion through speed variance of the hydraulic motor 53. This means that the motor has a minimum rate of rotation for zero feed rate because it must drive the gear 83 at the same rate as gear 82 as previously explained for zero feed rate.

The angular position of the motor cylinder block 66 for zero feed rate is indicated by the axis 90. As the cylinder block is swung counterclockwise from this axis the rate of rotation of gear 54 is increased until the axis 91 is reached which indicates the position of the cylinder block for producing the maximum feed rate.

A rate determining and speed matching mechanism is provided in connection with the motor and operates to select a desired rate of feed and then to automatically maintain that rate regardless of the resistance of the cutting operation being performed by the machine. This mechanism is coupled in parallel with the differential mechanism and comprises a rate determining mechanism consisting of a large friction plate 92 and a friction roller 93, the friction roller being supported on a spline shaft 94 for radial adjustment with respect to the plate. The spline shaft is driven from the constant speed gear 61 through shaft 95, bevel gearing 96 and spur gearing 97.

The friction disc is connected by a shifter fork 98 to a rack 99 that intermeshes with a rotatable pinion 100. Rotation of the pinion moves the friction roller radially of the plate 92 and it will be obvious that when the friction roller is near the center of the plate it will rotate the plate at a relatively fast rate and when shifted to the periphery of the plate it will rotate it at a relatively slow rate.

The plate is formed integral with a shaft 101 which is supported on an anti-friction thrust bearing 102 and this thrust bearing is mounted in a slidable sleeve 103 whereby the plate may be continuously urged by a spring 104 into frictional engagement with the roller 93. The spring is interposed between an internal annular flange 105 formed on the sleeve and a fixed plate 106 forming the bottom of a bore 107 formed in a fixed part of the machine and in which the sleeve slides. The shaft 101 has a threaded portion 108 which is engaged by a nut member 109, the nut member having a bore 110 formed therein by which it is slidably supported on an unthreaded portion 111 of the shaft 101. The nut member has a gear 112 frictionally mounted thereon and forming part of the gear train 55 which is driven by the hydraulic motor 53.

The gear 112 is mounted between two shoulders 113 and 114 formed on the nut member and a friction plate 115 is interposed between the gear 112 and the shoulder 114 and continuously urged into frictional engagement therewith by springs 116. A pin 117 serves to prevent relative rotational movement between the friction plate 115 and the gear 112. It should now be apparent that the nut member is constantly driven by the hydraulic motor 53 and at whatever speed the motor is set for and that the threaded portion or screw 108 is driven by the friction plate. Since the nut member is slidably mounted on the shaft 105 any difference in speed between the rotation of the screw and nut will cause a relative axial shifting between the nut member and the shaft because the shaft is held in a substantially fixed position axially by the friction roller 93. Thus, movement of the nut member is a function of the differential between the rates of rotation of the screw and of the nut.

Advantage is taken of this movement to effect or correct a change in the rate of rotation of the hydraulic motor. The first is deliberately produced while the second is automatically produced in response to a change in operating conditions in the machine. In either case let it be assumed that the screw and nut are rotating in the same direction and at the same speed with the result that no relative axial movement is occurring between them.

A change in rate is deliberately effected by rotating the pinion 100, thereby shifting the friction roller 93 radially of the disc 92, thus increasing or decreasing the rate of rotation of the disc 92 and connected screw 108. This immediately causes a relative axial shifting between the screw and nut which is utilized to operate the control valve 67. This is accomplished by pivotally connecting a lever 118 at 119 to the valve plunger 67' and providing a ball-shaped end 120 on the lever 118 for engaging a groove 121 formed in the periphery of the nut member. The lever 118 is connected to the valve plunger at some point intermediate its length so that the other end of the lever can be pivotally connected at 122 to a link 123 which depends from a lug 124 formed integral with the cylinder block 66. The link is pivotally connected to the lug by a pin 125.

When the nut begins to move relative to the screw, it rotates the lever 118 about the pivot 122 causing movement of the valve plunger 67'. This will shift the plunger off center and cause a pressure flow in either line 71 or 71', thereby shifting the cylinder block 66. Since a slight delay will occur before the shifting of the cylinder block registers in the form of a change in rate of the gear 54, and since the nut is continuing its movement, a feed back connection comprising the link 123 is provided so that as soon as the cylinder block begins to move it will cause a movement of the valve plunger in a direction opposite to that in which it was first shifted by rotating the lever 118 about the pivot 120, thereby tending to close or centralize the valve plunger 67'. This serves as a sort of anticipating mechanism and prevents overrun of the cylinder block and thus reduces hunting in the system.

The ratio of the arm 119—122 to the arm 119—120 of the lever 118 is made preferably in approximately a 2–1 ratio whereby the valve movement effected by the nut is relatively slower than the valve movement effected by the cylinder block. Since the follow-up or anticipating movement effected by the cylinder block is faster than the original movement, the tendency to overrun is largely eliminated, which prevents oscillation from being set up. As the motor comes to the new required speed the nut slows down and finally stops when its speed matches the speed of the screw.

In the second case mentioned above, a change in rate may also be effected automatically by sudden increases or decreases in the cutting load which would be reflected in variation of the motor speed and thereby in rate changes of the nut relative to the constant speed of the screw. Readjustment of the motor speed would be brought about, however, in the same manner as previously explained.

It will now be evident that a variable feed mechanism is provided from which any feed rate may be selected, and that means are provided for automatically maintaining that rate regardless of changes in load on the machine.

Figures 4, 5, 6, 11:
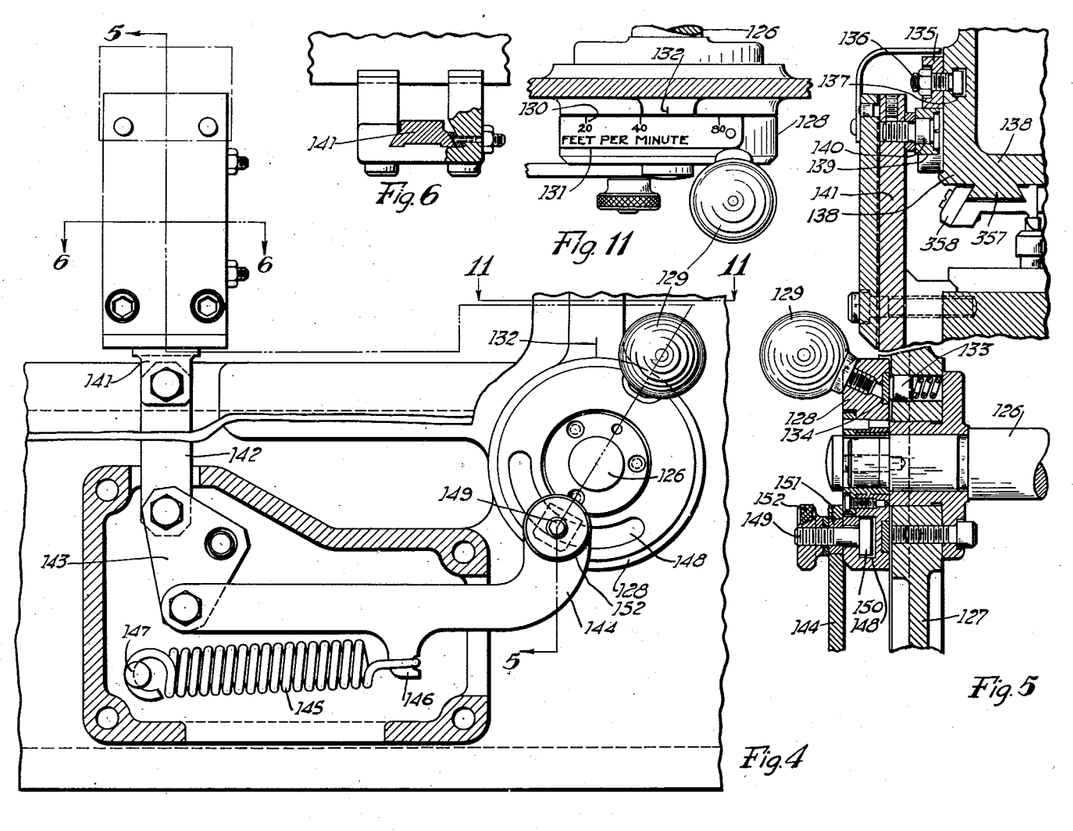
Figure 4 is an enlarged detail view of the variable feed control attachment as viewed from the front of the machine.
Figure 5 is a section taken on the line 5—5 of Figure 4.
Figure 6 is a detail section on the line 6—6 of Figure 4.
Figure 11 is a detail plan view of the rate control dial as viewed on the line 11—11 of Figure 4.

The feed rate selecting mechanism is shown more particularly in Figures 4, 5, 6 and 11 of the drawings to which reference may now be had. The pinion 100 shown in Figure 2 which, as previously explained, operates the shifter for adjusting the friction roller 93, is mounted on the end of a shaft 126 which shaft extends through the front wall 127 of the bed 10 for rotation by a dial 128 permanently secured to the end of the shaft. For convenience of rotation this dial has an operating knob 129 by which the dial may be rotated to align any of the feed rate indication graduations 130 on the plate 131, Figure 11, with a fixed reference mark 132 inscribed on a fixed part of the machine as shown in Figures 4 and 11.

Thus, any desired feed rate may be manually selected by means of this mechanism. The dial is frictionally held in any position by a friction mechanism comprising a spring pressed plunger 133 mounted in a socket of the plate 127 and engaging a flat friction ring 134 which is carried by the dial.

Means have also been provided whereby this dial may be automatically adjusted to obtain a variable feed rate during a single stroke of the table. This is accomplished by providing a variable feed rate determining cam 135 which has a properly shaped contour in accordance with feed rate variations desired at different points in the table stroke and this plate is attached by T-bolts 136 mounted in a T-slot 137 to the face of a chip and coolant receiver 138 which, in turn, is attached to the front of the table 12, the relationship being more clearly shown in Figure 8 of the drawings.

A follower roller 139 rides against the underside of the cam plate 135 and is rotatably supported by a shaft 140 attached to the upper end of a reciprocable slide 141. As shown in Figure 4, this slide is connected through a link 142 and a bell crank 143 to a lever 144. A spring 145 has one end connected to a depending lug 146 formed on the lever 144 and the other end connected to a fixed pin 147 for exerting a constant urge on the lever in a direction to effect clockwise rotation of the bell crank 143 and thereby a continuous urge on the roller 139 into engagement with the underside of the cam.

The dial 128 has an arcuate shaped T-slot 148 formed therein for receiving a clamping screw 149 having a T-shaped head 150 riding in the slot. The screw passes through a bushing 151 formed in the end of the lever 144 and a knurled clamping nut 152 threaded on the end of the screw serves to operatively connect the lever 144 to the dial 128 while still permitting relative rotation of the lever with respect to the dial.

The vertical movement of the slide 141 is of limited extent and is not sufficient to effect rotation of the dial throughout its complete range of movement and therefore the adjustable connection of the lever 144 to the dial is provided to select a specified range of feed rates suitable to the operation in hand. When the automatic feed rate feature is not desired the knurled nut 152 may be loosened which thereby permits independent rotation of the dial.

Figure 3:
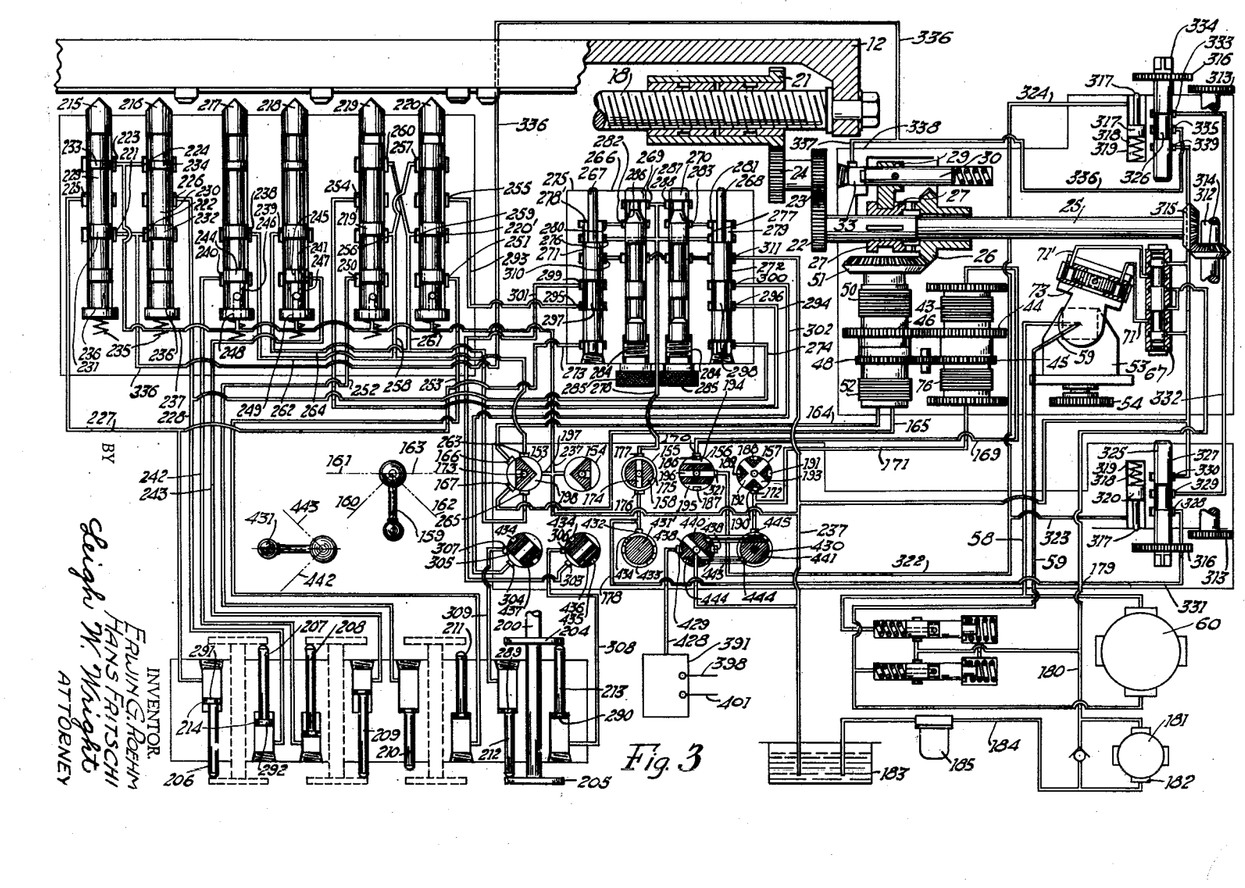
Figure 3 is a diagrammatic view of the hydraulic control mechanism for the table transmission and including the interlock control for the spindle transmission.

The direction and rate of movement of the table is determined by the direction clutches 50 and 52, the rapid traverse clutch 43 and the feed clutch 76. All of these clutches are hydraulically operated clutches and are connected to a single control valve, various sections through which are shown in Figure 3 and indicated by reference numerals 153, 154, 155, 156 and 157. This valve has a rotatable plunger 158 which is connected by the gearing 158' to the operating handle 159 as shown in Figure 20, the handle being mounted on the front of the machine as shown in Figure 1 of the drawings.

In Figure 3 the handle is shown in a stop position and in addition to this it has four other positions, two of which are feed positions and two of which are rapid traverse positions. In other words, the lever is movable clockwise through an angle of 45 degrees to a feed left position indicated by the axis 160 and another 45 degrees to a rapid traverse left position indicated by the axis 161. It is also movable 45 degrees in a counterclockwise direction to a feed right position indicated by the axis 162, and another 45 degrees to a rapid traverse right position indicated by the axis 163. Thus, the lever has five different positions which means that the plunger 158 may also assume five different positions.

The direction determining clutches 50 and 52 are connected by channels 164 and 165 to ports 166 and 167 of the valve section 153. The rapid traverse clutch 43 is connected by channel 169 to port 170 of section 156 and the feed clutch 76 is connected by a channel 171 to port 172 of section 157. The plunger 158 has an axial bore 173 which serves as a pressure supply channel and this bore is intersected by a cross bore 174 formed in the periphery of the plunger and which is always in communication with ports 176 and 177. The port 176 is supplied through channel 178 which is branch connected at 179 to a pilot pump supply line 180 that is maintained under pressure by a pump 181. This pump has an intake 182 through which fluid is withdrawn from a reservoir 183 through a channel 184 in which is serially arranged a filter 185.

The annular groove 175 serves to maintain a constant pressure supply connection between the fixed ports 176 and 177 regardless of the rotatable position of the valve plunger whereby the bore 173 is always under pressure. The valve plunger is shown in a stop position and it will be noted from section 153 that the pressure bore 173 is connected to ports 166 and 167 whereby both of the direction clutches 50 and 52 are operatively engaged which locks the table. The grooves 186 and 187 in section 156 and the grooves 188, 189, 190 and 191 in section 157 are all exhaust or reservoir grooves. From this it will be seen that the port 170 leading from the rapid traverse clutch 43 is connected to reservoir and that the port 172 leading from the feed clutch 76 is connected to reservoir whereby neither the forward nor the reverse gear trains are rotated.

Referring to section 157 of the rate and direction control valve, it will be noted that the valve has two cross bores 192 and 193 which intersect at right angles and also intersect the axial pressure bore 173 whereby when the handle 159 is rotated to the position 160 the pressure bore 193 registers with port 172, thereby admitting pressure to channel 171 to effect engagement of the feed clutch 76, or when the handle 159 is rotated to the position 162, the cross bore 192 registers with port 172 to effect the same result.

Thus, whether the handle 159 is rotated to the position 160 or the position 162 the feed clutch is caused to be engaged.

Referring to section 156 it will be noted that the plunger is provided with two segmental grooves 194 and 195 so that even although the plunger is rotated 45 degrees in either direction the port 170 remains connected to the reservoir groove 186 by means of the groove 194 whereby the rapid traverse clutch remains disengaged for either feed position. When the valve is rotated 90 degrees from the position shown to either of the rapid traverse positions 161 or 163 a cross pressure bore 196 registers with the port 170, thus admitting pressure to channel 169 to effect engagement of the rapid traverse clutch 43. At the same time either the reservoir groove 189 or the reservoir groove 191 is in registry with the port 172 providing for disengagement of the feed clutch 76 during rapid traverse.

As previously mentioned, when either the feed clutch or the rapid traverse clutch is engaged, the gears 46 and 48 are simultaneously driven in opposite directions and it is, therefore, necessary to disconnect one of the clutches associated therewith. This is accomplished as shown in section 153 of the valve by providing a reservoir port 197 and a double intersecting segmental groove 198 whereby upon rotation of the valve plunger through 45 degrees counterclockwise the port 166 is connected to the reservoir port 197 to release the pressure on direction clutch 50 while maintaining the pressure connection to the port 167, or if the valve is rotated clockwise the port 167 is connected to the reservoir port 197 and the pressure connection is maintained to the port 166 whereby the clutch 52 is released and the clutch 50 is engaged. This same condition prevails even although the valve is rotated through another 45 degrees in either direction for rapid traverse purposes.

Figure 12:
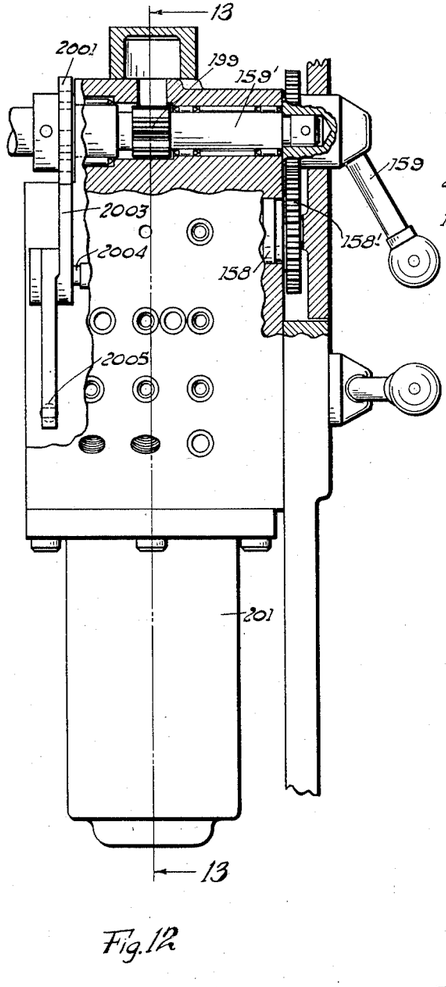
Figure 12 is a view in elevation with parts broken away of the rate and direction table control lever as viewed on line 12—12 of Figure 1.
Figure 13:
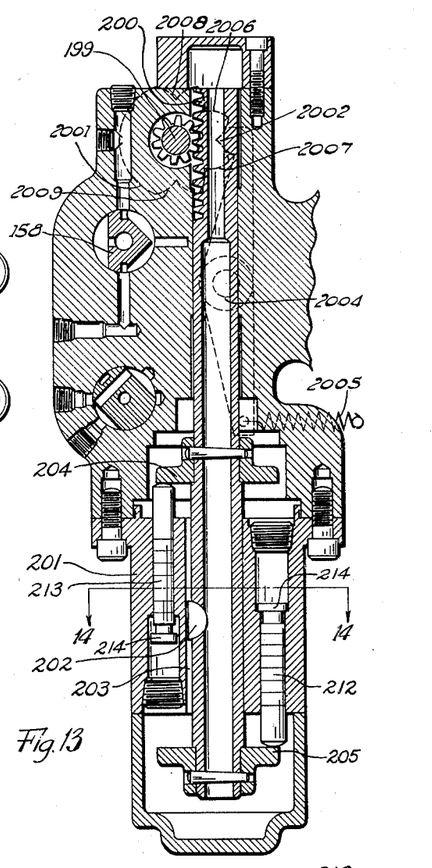
Figure 13 is a section on the line 13—13 of Figure 12.
Figure 14:
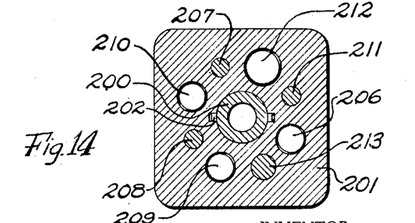
Figure 14 is a section on the line 14—14 of Figure 13.

Thus, the portion of the valve at section 153 selects the direction of table movement regardless of whether a feed rate or a rapid traverse rate is desired. It will now be apparent that the lever 159 may be utilized to select the rate and direction of movement of the table and that these results are accomplished by providing four different positions for the lever as well as an intermediate stop position. This lever may, of course, be rotated by hand but for automatic cyclic operation of the machine it is necessary to provide additional means for effecting this rotation automatically. This is accomplished by providing a pinion 199 on the shaft 159' which supports the lever 159 as shown in Figures 12 and 13 and a reciprocating rack bar 200 in engagement with the pinion.

The rack plunger is slidably mounted in a control block 201 and is provided with a key 202 which slides in a spline 203 to hold the plunger against rotation and thereby maintain alignment of the rack teeth with the pinion. The rack plunger has a pair of circular discs 204 and 205 attached thereto in spaced relation and located on opposite sides of control block 201.

The control block has four sets of operating plungers slidably mounted therein and spaced circumferentially about the rack plunger 200 and in such relation that they may engage the discs 204 and 205 for shifting purposes. A rolled-out view of these plungers is shown in Figure 3. They comprise a first pair of plungers 206 and 207, a second pair of plungers 208 and 209, a third pair of plungers 210 and 211 and a fourth pair of plungers 212 and 213.

It will be noted that of each pair of plungers one is engagable with the plate 204 and the other with the plate 205. Each plunger has a piston head 214 which is slidable in a cylinder whereby upon admission of pressure to the cylinder the plunger may be shifted to effect axial movement of the rack plunger 200.

The sets of plungers are of different lengths and this is necessary in order to move the rack plunger different distances and thereby the valve to any one of its five different positions. The full line position of the plunger shown in Figure 3 represents the stop position from which the plunger is movable axially to two different positions above for feed and rapid traverse respectively for one direction of table movement and to two different positions below for feed and rapid traverse respectively for the other direction of table movement. It will be noted that the plungers 212 and 213 are at the limit of their stroke and therefore are capable of moving the plunger from either of its two upper positions or its two lower positions to the central position shown.

It is, of course, necessary in starting the machine to manually move the lever 159 to one of its four operating positions after which any change or succession of changes may be made automatically.

The pair of feed plungers 210, 211 are utilized for shifting the control plunger from either one of its rapid traverse positions to one of its feed positions. The extreme upward or downward position of the rack plunger is the rapid traverse position, and if the plunger, for instance, is manually moved to its extreme upward position and the plunger 210 was fluid actuated it would push the plunger downward to a feed position. Similarly, if the rack plunger was moved downward to its rapid traverse position the plunger 211 would move it up to its feed position for the other direction. Therefore, these two plungers are made shorter than any of the other plungers.

The plungers 208 and 209 are utilized to produce the other effect of shifting the rack plunger from either feed position to a rapid traverse position. Since the rapid traverse position is the extreme position in either direction these two plungers are made longer than any of the other plungers.

In other words, if the rack plunger was in a feed position and the plunger 208 was hydraulically actuated, it would shift the control plunger 200 upward to its extreme position corresponding to rapid traverse in one direction. Similarly, the plunger 209 would operate to shift the control plunger 200 downward from a feed position to a rapid traverse position.

The plungers 206 and 207 are the reversing plungers and are made of such length that they can move the rack control plunger 200 from either a rapid traverse or a feed position for one direction of table movement to a feed position only for the opposite direction of table movement. In other words, whenever the table is reversed its new direction of movement will take place at a feed rate. If a rapid traverse rate is desired additional dogs must be set so as to effect operation of one of the rapid traverse plungers 208 or 209 after the feed rate has been established.

Figure 7:
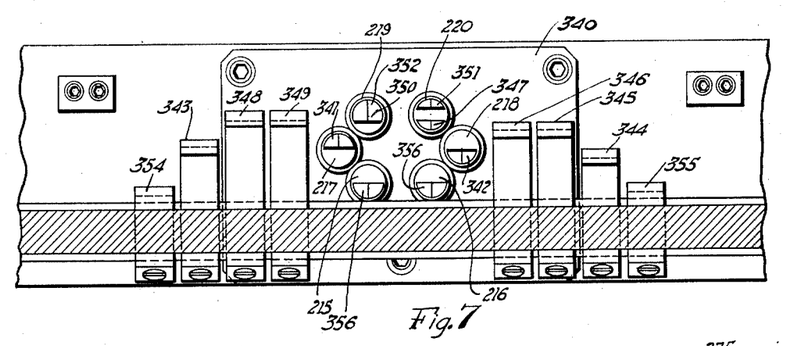
Figure 7 is a plan view of the trip control plungers and the trip dogs for operating the same as viewed on the line 7—7 of Figure 3.

Fluid operation of these various operating plungers is controlled by a series of pilot valves in the form of trip plungers which are indicated by the reference numerals 215, 216, 217, 218, 219 and 220, which are arranged as shown in Figure 7. The plungers 215, 216, 217 and 218 are individual for control purposes to the plungers 206, 207, 208 and 209 respectively. The plungers 219 and 220 are so connected that they control operation of plungers 210, 211, 212 and 213. The valve portion of plungers 215 and 216 have pressure ports 221 and 222 respectively, exhaust ports 223 and 224 respectively and intermediate ports 225 and 226 respectively which are connected by channels 227 and 228 to the operating cylinders for the reversing plungers 206 and 207. The plungers 215 and 216 have annular grooves 229 and 230 formed therein which terminate in wide spools 231 and 232 at one end and narrow spools 233 and 234 at the other end.

Springs 235 act on the ends of the plungers to hold them in operating position, each plunger having a shoulder 236 which limits its movement by the spring. It will be noted that in the normal position of the plungers, which is that shown in Figure 3, the pressure ports 221 and 222 are closed by the spools 231 and 232 and that the intermediate ports 225 and 226 are connected to the exhaust ports 223 and 224 respectively by the annular grooves 229 and 230. Thus, normally, there is no operating pressure on the reversing plungers 206 and 207. Should either of these plungers be depressed, however, by a suitable dog carried by the table the exhaust port will be disconnected by the proper spool, either 233 or 234, and a pressure port 221 or 222 will be connected to the respective intermediate port 225 or 226, thereby causing operation of one of the plungers 206 or 207. The exhaust ports 223 and 224 are connected to a common return line 237.

The next pair of plungers 217 and 218 have pressure ports 238 and 239 and a pair of intermediate ports 240 and 241 which are connected by channels 242 and 243 to the operating cylinders for the rapid traverse plungers 208 and 209. The trip plungers 217 and 218 are provided with spools 244 and 245 respectively which are flanked by annular grooves to control the connection of ports 240 and 241, either with one of the pressure ports or with one of the exhaust grooves 246 or 247. These grooves are connected by interdrilling 248 and 249 to the common return line 237. These plungers are also held in position by springs 235 and limited in their movement by shoulders 236. When these plungers are in their normal position as shown in Figure 3 the ports 240 and 241 are connected to exhaust as shown and when the plunger is moved downward the spools 244 and 245 uncover the ports 240 and 241 sufficiently to effect connection with the pressure ports 238 and 239 respectively.

The pair of plungers 219 and 220 have ports 250 and 251 which are connected by channels 252 and 253 respectively to the operating cylinders for the feed plungers 210 and 211. They also have a pair of ports 254 and 255 which are eventually connectible to the operating cylinders for the stop plungers 212 and 213. The plunger 219 has a pressure port 256 and the plunger 220 has a pressure port 257 which are connected to a common supply line 258.

Again, the plunger 220 has a port 259 and the plunger 219 has a port 260 and these two ports are connected to a common line 261.

Attention is invited to the fact at this point that the pressure ports of the plungers 217 to 220 are so connected to pressure in accordance with the direction of movement of the table that certain of the plungers are effective during one direction of table movement, and the remaining plungers are effective during the other direction of table movement, the purpose of this being to obviate the necessity for using latch dogs. This may be characterized in a general way as applying directional control to the trip plungers. The application of directional control to these plungers is obtained in the following manner.

The channel 262 and its branch channel 258 terminate in a port 263 of the rate and direction control valve as shown in valve section 153. Similarly, the channel 264 and its branch 261 terminate in a port 265 also shown in section 153. It will be noted that in the stop position of the rate and direction control valve that both of the ports 263 and 265 are connected to the exhaust port 197 and thereby through the common return line 237 to the reservoir 183. Thus, when the machine is stopped all of the plungers 217 to 220 inclusive are rendered ineffective if depressed by dogs. Although pressure is normally connected at all times to the reversing trip plungers 215 and 216, these plungers in their normal position connect the supply lines to the operating plungers 206 and 207 to reservoir, from which it should now be evident that none of the operating cylinders 214 have pressure in them when the machine is stopped and even although the machine would come to a stop position with a stop dog holding one of the plungers 219 or 220 down because even although that plunger is held down the operating pressure is disconnected therefrom by rotation of the control valve to the stop position. This movement is insured by providing a multiple detent plate 2001 on the shaft 159' as shown in Figures 12 and 13. This plate has a central notch 2002 which is engageable by a detent 2003 pivoted on a pin 2004 and held against the plate by a spring 2005. Other notches 2006 and 2007 are provided for the two feed positions and notches 2008 and 2009 for the rapid traverse positions. The purpose of this is that when the control lever 159 is manually thrown from its stop position to any of its operating positions that it does not have to overcome pressure in any of the operating cylinders 214.

When the valve plunger 158 is rotated through an angle of 45 degrees in one direction from the position shown in valve section 153 the port 263 becomes connected to the pressure groove 173 along with the port 166 whereby the ports 256, 257 and 238 are rendered active and the remaining ports 239, 259 and 260 remain inactive. This condition still obtains should the valve plunger be rotated in the same direction to a rapid traverse position. When the valve is rotated counterclockwise from the position shown the port 265 becomes connected to pressure along with the port 167 which now results in ports 259, 260 and 239 being rendered active and the remaining ports 238, 256 and 257 being rendered inactive. Thus, the valve 158 is enabled to apply directional control to the trip plungers in such a manner that if certain of the plungers are depressed during a given direction of table movement they are ineffective for producing any change in the rate of table movement.

Continuing now with the operation of the trip plungers 219 and 220, these plungers have spools 219' and 220' which are of such width and so located axially that upon a predetermined downward movement the pressure port 256 is connected to port 250 in the case of plunger 219, or pressure port 259 is connected to port 251 in the case of plunger 220. In either case, this produces a feed movement.

Upon further downward movement of plunger 219, port 256 is disconnected from port 250 and connected to port 254 to thereby effect operation of the stop plunger 212. There will be no delay action because the delay plunger 268 is not actuated and therefore the ports 296 and 300 will remain interconnected.

Similarly, further downward movement of plunger 220 will interconnect port 259 with port 255 and thus effect actuation of plunger 213.

It will be noted that due to directional control only one of the lines 258, 261 is under pressure at a time, which renders only one of the trip plungers effective as a feed and stop plunger. However, there is a cross connection to the other plunger as at port 257 or 260 which serves to connect pressure to the other control plunger as 212 or 213. The purpose of this is to alternately supply pressure to the plungers in accordance with the direction of movement so that if a delay action is needed at reversal, the cylinders 214 will be full of fluid when the supply is cut off by the delay plungers 267, 268 now to be explained.

In reversing the direction of table movement it is often desired that the table dwell for a predetermined time after it has stopped, and before it starts its new direction of movement. This dwell is obtained by providing a delaying mechanism, which is indicated generally by the reference numeral 266 in Figure 3.

This mechanism comprises two delay plungers 267 and 268 and a pair of delay throttle valves 269 and 270, there being one for each direction of movement. This makes it possible to provide a delay at one end of the table movement which is different than the delay at the other end of the table movement. These are shown more fully in Figures 9 and 10.

Figure 9:
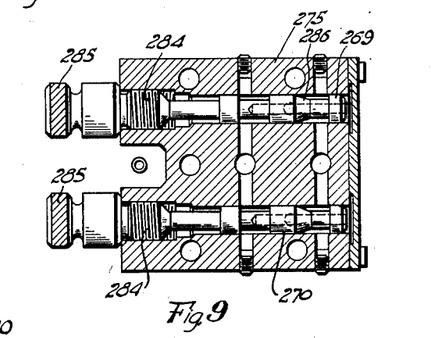
Figure 9 is a section on the line 9—9 of Figure 8 showing the adjustable delay valves for the reversing mechanism.
Figure 10:
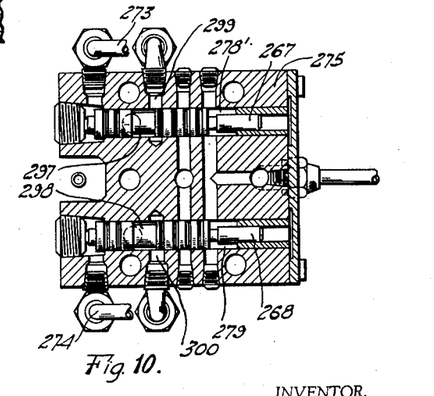
Figure 10 is a section on the line 10—10 of Figure 8 showing the delay pilot valves.

One end of the cylinders 271 and 272 containing the plungers 267 and 268 are connected by branch lines 273 and 274 to channels 227 and 228 respectively whereby when either of these channels are under pressure the respective plunger will be shifted. The rate of shifting will depend upon the setting of the throttle valves. It will be noted that the pressure entering port 273 or 274 is capable of operating on the full diameter of the plungers, while at the other end the plungers have a reduced diameter which extends through the housing 275, thereby reducing the effective diameter at that end. The purpose of this is that the ports 276 and 277 which supply pressure to the reduced ends of the plungers are connected through channel 278 and port 177 of the rate and directional control valve to the same source of pressure that the ports 273 and 274 are connected so that by reducing the effective area at one end a pressure differential may be obtained for shifting the plungers.

The ports 276 and 277 are provided simply for the purpose of supplying fluid to the chambers 278' and 279, the fluid being forced out of these chambers by movement of the plungers through ports 280 and 281 which are connected to ports 282 and 283 of the throttle valves. The throttle valve plungers 269 and 270 are threaded in the housing 275 as shown at 284 and are provided with knurled operating knobs 285 and mounted on the front of the machine as shown in Figure 1. Each throttle valve plunger has a tapered portion 286 which is adjustable to variably throttle the ports 282 and 283 and the fluid passing through these ports returns to the supply line 278 through ports 287 and 288.

The method of obtaining a delayed reversal is accomplished by having a reversing plunger 206, or 207 as the case may be, shift the control plunger 200 to a stop position, preventing movement of the plunger 200 through the stop position by placing pressure in one of the operating cylinders for either plunger 212 or 213, and then releasing the pressure from these cylinders at a predetermined slow rate until the desired time of delay has been accomplished.

It will be recalled that all of the operating cylinders 214 are supplied from the same source of pressure and therefore in order to enable the plungers 212 or 213 to stop the movement of plunger 200 caused by actuation of the operating plungers 206 and 207 the diameters of the piston heads 289 and 290 are made larger than the diameter of the piston heads 291 and 292 of plungers 206 and 207 respectively. Thus, when the plunger 206 or 207 is hydraulically actuated it will shift the plunger until either the disc 204 or the disc 205 on plunger 200 engages the end of either plunger 212 or 213 depending upon the direction of actuation and then the plunger will stop. It must be remembered that while this part of the operation has been proceeding, the rate and direction control valve plunger 158 has been rotated from some position into the position shown in section 153. This would normally disconnect the pressure from the operating cylinders of pistons 212 and 213 if directly connected to the trip valve plungers 219 and 220. To obviate this they are connected through the plungers 267 and 268 in the following manner.

The ports 254 and 255 of the trip plungers 219 and 220 are connected through channels 293 and 294 to ports 295 and 296 of the delay plungers and when these plungers are in their normal position, as shown, these two ports are connected by annular grooves 297 and 298 to ports 299 and 300. These latter ports are connected by channels 301 and 302 to ports 303 and 304 of a spindle control valve 305, the purpose of which will be explained hereafter.

In the running position of this valve the ports 303 and 304 are connected to ports 306 and 307 and thereby through channels 308 and 309 to the operating cylinders for the plungers 212 and 213. It will be noted that the ports 295 and 296 are so positioned that immediately upon upward movement of either of plungers 267 and 268 these ports will be immediately closed, thereby trapping fluid in channels 301 and 302 while it is still under considerable pressure. This same movement will also close ports 276 and 277. The portion of the movement of plungers 267 and 268 which closes these four ports can take place immediately upon pressure entering either channel 227 or 228 due to actuation of the reverse valve plungers and therefore this portion of the movement can be completed by the time that the rate and direction control valve plunger has been rotated to a stop position.

All of this results in the table coming to a stop which means that the dog which operated either the plunger 215 or 216 will stop in position to hold the plunger depressed whereby the pressure will still be maintained in either channel 227 or 228 to complete the further movement of the trip plunger which will terminate when either the annular groove 297 or 298 has been moved into such position that the ports 299 or 300 will be connected to exhaust ports 310 or 311. When this has happened the pressure will be released in the operating cylinders for plungers 212 and 213 permitting the operating plungers 206 or 207 to complete the additional movement of the control plunger 200 to its proper feed position.

It will thus be seen that when the table is reversed that it is first brought to a stop, a delay action is introduced and then the table is restarted in a new direction and that this is all accomplished automatically.

Duplicate manually operable controls have been provided for traversing the table and these are mounted on opposite sides of the bed for the convenience of the operator. Interlocks have been provided for rendering the manual controls inoperable during power operation of the table, while on the other hand when the manually operable controls are effective they render the reversing trip plungers 215 and 216 ineffective by disconnecting the operating pressure therefrom. Normally, the operating pressure is continuously connected to these plungers in order that they may rotate the rate and direction control valve through its neutral position. With the rate and direction control valve plunger in neutral position it will be obvious that if one of the reversing plungers should be accidentally engaged by a trip dog during manual traverse of the table that the plunger would be rotated to a feed position causing power operation of the table and since power operation is dominant as respects manual operation, the manually operable controls would be rendered ineffective and the table would continue to be moved by power, which condition is wholly undesirable.

The mechanism for effecting manual operation of the table comprises a shaft 312 which extends crosswise of the bed 10 and at either end is provided with a spur gear 313. At an intermediate point the shaft 312 is provided with a bevel gear 314 which intermeshes with a bevel gear 315 mounted on the extended end of the shaft 25. The other end of the shaft is directly connected to the gear 22 and thereby to the table operating mechanism, and during power operation this shaft is rotated due to the engagement of the clutch 27 with the power driven gear 26.

Because of this, the spur gears 313 are rotated during power operation of the table. For manual operation axially shiftable spur gears 316 are mounted in the bed for engagement with the spur gears 313 but in order to prevent engagement during power operation interlock plungers 317 are provided which normally hold the gears 316 out of mesh with the corresponding gears 313. These plungers are normally held in the position shown by springs 318. These plungers are slidable in cylinders 319 and are provided with piston portions 320 whereby fluid pressure may be connected to one end of the cylinders to effect retraction of the plungers when the rate and direction control valve is in a neutral position. This makes it possible then for the operator to axially shift the gear 316 into mesh with the gear 313 without any resistance. Should these two gears be left in mesh the hydraulic connections are such that pressure is relieved in the cylinders and the springs 318 immediately shift the gears 316 out of mesh and hold them against return movement until the table is stopped.

This automatic operation of the plungers is accomplished by providing the rate and direction control valve at section 156 with a diametrical pressure cross bore 196 which in the stop position is in registry with port 321. This connects pressure to channel 322 which has branch connections 323 and 324 to the ends of the respective cylinders 319. When the rate and direction control valve is rotated through 45 degrees in either direction it will be obvious that the port 321 is connected to exhaust, thereby relieving the pressure in the cylinders 319 whereby the springs 318 may become effective.

The gears 316 are mounted on the ends of short shafts 325 and each shaft is provided with an annular groove 326 which may be utilized as a valve for controlling the connection of pressure to the reversing trip plungers 215 and 216. To this end the bore 327 in which the shaft slides is provided with three ports 328, 329 and 330. The port 328 is connected by channel 331 to the supply line 188. The port 328 is thus a constant pressure port and is connected by the annular groove 326 to the port 329 when the gear 316 is disengaged whereby fluid pressure flows through the line 332 to port 333 of the other control shaft 334.

When this shaft is in an inoperative position the port 333 is connected by the annular groove 326 to port 335 and thereby to channel 336 which leads to the pressure ports 221 and 222 of the reverse trip plungers 215 and 216. It will thus be seen that the supply pressure for the trip plungers is serially connected through the two manually operable devices whereby if either one is shifted to an operative position either the port 328 or the port 333 will be closed to disconnect the supply pressure to the trip plungers.

The channel 336 is provided with a branch 337 which leads to port 338 in the cylinder 33 of the power disconnect clutch 27 whereby this clutch is held in engagement whenever the manual controls are in an inoperative position. The real purpose of this clutch is to disconnect the power drive mechanism from the shaft 25 during manual rotation so that all of the power driven gearing does not have to be rotated manually during manual traverse of the table. When either of the shafts 325 or 334 is shifted for manual operation the port 329 is connected to the exhaust port 330 or the port 335 is connected to an exhaust port 339 which thereby makes it possible for fluid to escape from line 336 and permit shifting of clutch 27.

Figure 8:
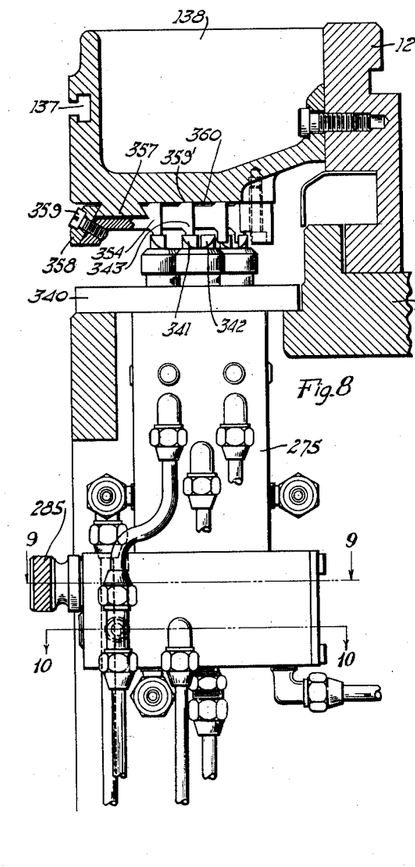
Figure 8 is a section showing the trip control plungers and trip dogs in elevation as viewed on the line 8—8 of Figure 1.

The various trip plungers are reciprocably mounted in a trip plunger valve block 340 attached as a unit to the top of the bed 10 in front of the table as shown in Figures 7 and 8. Referring to Figure 7, the two reverse plungers 215 and 216 are located at the front furthest from the table, the feed and stop plungers 219 and 220 located nearest the table, and the rapid traverse plungers 217 and 218 located in between. The contact portions on the tops of the plungers have been so aligned that operating dogs for one direction of movement will not contact or idly depress any plunger except the one for which it is particularly designed. For instance, the rapid traverse plungers 217 and 218 are provided with wedge-shaped operating portions 341 and 342 respectively and these lie in separate planes for engagement by trip dogs 343 and 344 respectively. The stop dog 345 and the feed dog 346 are adapted to engage the front wedge-shaped operating portion 347 of plunger 220, while the stop dog 348 and feed dog 349 are adapted to engage the central operating portion 350 of trip plunger 219.

The rear operating portion 351 of plunger 220 and the rear operating portion 352 of plunger 219 lie in the same plane and are engageable by fixed safety dogs 353 located at extreme ends of the dog carrying structure and are only effective if the table should overrun its range of movement. The reversing dogs 354 and 355 lie in the same plane as the operating portions 356 on the reverse plungers 215 and 216 and these are arranged in the same plane because either of the trip dogs cannot go beyond its particular plunger due to the fact that depression of the plunger causes reverse movement of the table.

All of the trip dogs are mounted on the underside of the chip and coolant receiver 138 which is attached to the front of the table as shown in Figure 8. The method of attachment comprises the formation of a dovetailed guide 357 on the bottom of the receiver and providing each of the dogs with a corresponding formation to slide on this guide one guide portion 358 of each dog being made separate so that a clamp screw 359 may be utilized for clamping the dog in position or for slightly loosening it so that the dog may be slid to a new position.

It is, of course, necessary to remove the screw altogether if the dog is to be removed from the dovetailed guide. Each dog has an upper bearing surface 359' which bears against an established surface 360 formed on the bottom of the receiver at a definite height above the tops of the operating plungers. This makes it possible to establish a standard dimension for the height of the operating portion of the dog with the exception of the dogs for the feed and stop plungers which must be of different height because the plunger has two different positions as previously explained. In other words, the stop plunger is made the same height as the remaining plungers but the feed dogs are made less in height because a shorter movement of the plunger is all that is necessary to effect operation of the feed plunger. The height of these plungers has been diagrammatically illustrated in Figure 3 from which it will be seen that the feed control dog does not extend down as far as the remaining trip dogs.

It will be understood that the arrangement of dogs shown in Figure 7 is merely illustrative to show the relationship of the particular dogs with respect to the trip plungers with which they cooperate and is not in any sense to be considered as limiting or as showing a set-up for a particular operating cycle. It will be understood that these dogs may be rearranged or even some removed in accordance with the cycle to be performed on the machine and which procedure is clearly understood by those experienced in the art.

The spindle control valve 305 previously referred to has a rotatable plunger 430 provided with a control lever 431. This lever has three positions. It is shown in its control or run position in Figure 11 and is rotatable from this position to a stop position indicated by line 442 and to an automatic control position indicated by line 443. In its run position it interconnects lines 301 with 308, and 302 with 309 as shown in sections 436 and 437 of the valve.

In section 431 of this valve there is a pressure port 432 which is always in communication with an annular groove 433 to keep it under pressure. A pair of longitudinally extending grooves 434 and 435 intersect the annular pressure groove 433 and extend through sections 436 and 437 of the valve whereby when the valve is rotated to its stop position the pressure groove 434 is connected to lines 308 and 309 to effect shifting of the table control plunger 200 to a stop position. When the valve is rotated to its automatic position it does not change the connections established in the run position.

The valve plunger has a second pair of longitudinally extending grooves 438 and 439 which run from the annular pressure groove 433 to section 440 of the valve. This section has a port 429 which is connected by channel 428 to a pressure operated switch 391 for a spindle driving motor. A pair of leads 398 and 401 extend from this switch to suitable control mechanism for this purpose, but this mechanism forms no part of the present invention but is shown and described in copending divisional application, Serial No. 681,854, filed July 3, 1946. Suffice it to say that when the valve is in its run position, as shown in Figure 11, the pressure switch is actuated to cause driving of the spindle, and when the valve is rotated to a stop position the port 429 is connected to exhaust line 237 and the pressure switch is released to stop the spindle.

When the valve is rotated to its automatic position the port 429 is connected to a longitudinally extending groove 444 formed in the periphery of the valve plunger, and this groove extends from section 440 to section 441 where it intersects an annular groove that is always in communication with port 445. This latter port is connected to channel 171 which is the control line for the feed clutch 76 as previously described so that whenever line 171 is under pressure it will be obvious that the spindle control pressure switch is automatically actuated.

There has thus been provided a milling machine having an improved and simplified feed transmission in which the rate may be steplessly varied and once the rate is determined, it is automatically maintained regardless of variation in load which normally would tend to vary the rate. These features are combined in a single mechanism which may also be connected for automatic adjustment by a feed rate control cam mounted on the table. It will also be noted that an improved and efficient trip control mechanism has been provided for the table transmission and which is so designed that latch dogs are not necessary. Where dog operation has been specified, it will be understood by those skilled in the art, that the showing herein is to be understood as illustrative and that the dogs may be set in accordance with the particular job in hand.

What is claimed is:

1. In a machine tool having a work support and a tool support, the combination of transmission means for effecting relative movement between the supports at different rates including a feed clutch, a rapid traverse clutch, a final motion transmitting train, means to selectively engage said clutches for actuation of the train, a constant speed prime mover for driving the rapid traverse clutch, a variable speed transmission for driving the feed clutch including a pump driven by said prime mover, a variable displacement motor, channels interconnecting said pump for actuation of said motor, means for varying the displacement of said motor, a drive train from the motor to the feed clutch, branch trains driven by the prime mover and the drive train respectively and terminating in opposed relation to one another, and means to measure the speed differential between said branch trains to effect adjustment of said motor displacement until said differential has been eliminated.

2. In a machine tool having a work support and a tool support, the combination of transmission means for effecting relative movement between the supports at different rates including a feed clutch, a rapid traverse clutch, a final motion transmitting train, means to selectively engage said clutches for actuation of the train, a constant speed prime mover for driving the rapid traverse clutch, a variable speed transmission for driving the feed clutch including a pump driven by said prime mover, a variable displacement motor, channels interconnecting said pump for actuation of said motor, means for varying the displacement of said motor, a drive train from the motor to the feed clutch, branch trains driven by the prime mover and the drive train respectively and terminating in opposed relation to one another, means to measure the speed differential between said branch trains to effect adjustment of said motor displacement until said differential has been eliminated, and variable speed means in one of said branch transmissions to vary the output thereof and thereby the rate of said motor.

3. In a milling machine having a work support and a tool support, the combination of transmission means for effecting relative movement between the supports at rapid traverse and feeding rates including a rapid traverse train, a feed train, a constant speed prime mover for driving said rapid traverse train, a pump driven by said prime mover, a variable displacement hydraulic motor actuated by said pump, means for operatively connecting the motor to the feed train, means for varying the displacement of said motor and thereby varying the feed rate, and fluid operable clutches for selectively connecting either of said trains for effecting said relative movement.

4. In a machine tool having a work support and a tool support, the combination of transmission means for effecting relative movement between said supports at rapid traverse and feeding rates including a feed gear and a rapid traverse gear, a constant speed prime mover for driving said rapid traverse gear, a pump driven by said prime mover, a variable displacement motor actuated by said pump, a pair of oppositely rotatable coaxial gears, means operatively connecting one of said gears for rotation by the prime mover at a constant rate, means operatively connecting the other gear for rotation by the variable displacement motor at a rate which is equal to said constant rate when the motor is set for maximum displacement, a third gear intermeshing with said pair of gears and operatively connected for rotation of the feed gear, and means to decrease the displacement of the pump to increase the rate of rotation of the feed gear.

5. In a machine tool having a work support and a tool support, a variable feed transmission for effecting a feeding movement between the supports including a fluid operable variable displacement motor, a differential mechanism including a first gear driven at a constant speed, a second gear driven by said motor, a third gear intermeshing with the first-named gears and operatively connected for effecting said feeding movement, and control means to vary the displacement of said motor including coaxial rotatable members one of which is driven by said motor, means for driving the other member at variable speeds, and means responsive to differences in the rate of rotation of said members for automatically adjusting the displacement of said motor.

6. In a machine tool having a work support and a tool support, the combination of transmission means for effecting relative movement between the supports including a feed transmission, a rapid traverse transmission, intermediate gearing, fluid operable clutches for connecting the respective transmissions to said gearing, a final drive train, a pair of reverse gears driven in opposite directions by said gearing, fluid operable clutches for alternately connecting the respective reverse gears to the final train, a source of pressure, selector means for coupling said pressure in various combinations to said clutches to determine the rate and direction of relative movement between said supports, said selector having another position for disconnecting pressure from the first pair of clutches and connecting pressure to said second pair of clutches to lock the final drive train against inadvertent movement when power is disconnected therefrom.

7. In a machine tool having a work support and a tool support, the combination of means for effecting relative movement between the supports including a final shaft connected to the movable support, feed and rapid traverse transmissions, an intermediate shaft, means for selectively connecting said transmissions to said intermediate shaft, a selector clutch for connecting said intermediate shaft to the final shaft, manually operable means for rotating the final shaft including a shiftable member having an operating and a non-operating position, and means controlled by said member when in a non-operating position to effect engagement of said clutch and when in an operating position to effect disengagement of said clutch.

8. In a milling machine having a work support and a tool support, the combination of transmission means for effecting relative movement between the supports including a feed and a rapid traverse clutch, a pair of reversing clutches, fluid operable means for shifting said clutches, a source of pressure, a multiposition control valve for connecting said source of pressure selectively to said clutches, a control rod for positioning said valve, a pair of oppositely acting hydraulic plungers for shifting said rod to a central or stop position, a second pair of plungers alternately operable for shifting said rod to one of its feed positions located on opposite sides of its stop position, additional fluid operable means for shifting said rod beyond its feed position to effect rapid traverse, and another set of plungers for shifting said control rod from any of its positions on one side of its stop position to a feed position on the other side thereof.

9. In a milling machine having a work support and a tool support, the combination of transmission means for effecting relative movement between the supports including a feed and a rapid traverse clutch, a pair of direction determining clutches, fluid operable means for shifting said clutches, a source of pressure, a multiposition control valve for connecting said source of pressure selectively to said clutches, a control rod for positioning said valve, a pair of opposed hydraulically actuated plungers for shifting said rod to a central or stop position, a second pair of plungers alternately operable for shifting said rod to one of its feed positions located on opposite sides of its stop position, additional fluid operable means for shifting said plunger an additional distance to effect rapid traverse, another set of plungers for shifting said control plunger from any of its positions on one side of its stop position to a feed position on the other side thereof, and means to stop and delay the movement of the control rod when it reaches its central position.

10. In a machine tool having a work support and a tool support, the combination of means for effecting a relative feeding movement between said supports including a fluid operable variable displacement motor, fluid operable control means for varying the displacement of said motor including a control valve, a speed matching mechanism including a first rotatable member, independent means for driving said member including an adjustable rate variator which may be set to determine the support feed rate desired, a second member in threaded engagement with the first and driven by said motor, and means to match the speed of the second member with that of the first member including an operative connection between said second member and said control valve whereby any bodily movement of said second member due to differences in rate with respect to the first member will cause actuation of said valve and thereby displacement adjustment of said motor.

11. In a machine tool having a work support and a tool support, the combination of means for effecting a relative feeding movement between said supports including a fluid operable variable displacement motor, fluid operable control means for varying the displacement of said motor including a control valve, a speed matching mechanism including a first rotatable member, independent means for driving said member including an adjustable rate variator which may be set to determine the support feed rate desired, a second member in threaded engagement with the first and driven by said motor, means to match the speed of the second member with that of the first member including an operative connection between said second member and said control valve whereby any bodily movement of said second member due to differences in rate with respect to the first member will cause actuation of said valve and thereby displacement adjustment of said motor, and manually operable means for adjusting said rate variator to increase or decrease the rate of rotation of said first member and thereby through said speed matching mechanism effect a corresponding increase or decrease in the rate of rotation of said motor and thereby a change in the feeding rate of said support.

12. In a machine tool having a work support and a tool support, the combination of means for effecting a relative feeding movement between said supports including a fluid operable variable displacement motor, fluid operable control means for varying the displacement of said motor including a control valve, a speed matching mechanism including a first rotatable member, independent means for driving said member including an adjustable rate variator which may be set to determine the support feed rate desired, a second member in threaded engagement with the first and driven by said motor, means to match the speed of the second member with that of the first member including an operative connection between said second member and said control valve whereby any bodily movement of said second member due to differences in rate with respect to the first member will cause actuation of said valve and thereby displacement adjustment of said motor, a feed rate control cam carried by the movable support, a plunger yieldingly held into engagement with said cam, and means operatively connecting said plunger with said rate variator to effect automatic adjustment thereof.

13. In a machine tool having a work support and a tool support, the combination of means for effecting a relative feeding movement between said supports including a fluid operable variable displacement motor, fluid operable control means for varying the displacement of said motor including a control valve, a speed matching mechanism including a first rotatable member, independent means for driving said member including an adjustable rate variator which may be set to determine the support feed rate desired, a second member in threaded engagement with the first and driven by said motor, means to match the speed of the second member with that of the first member including an operative connection between said second member and said control valve whereby any bodily movement of said second member due to differences in rate with respect to the first member will cause actuation of said valve and thereby displacement adjustment of said motor, a feed control cam carried by the movable support, a plunger yieldingly held into engagement with said cam, means operatively connecting said plunger with said rate variator to effect automatic adjustment thereof, said connecting means including a link and a crank disc, a bell crank connecting said link to the plunger, said link having a limited movement, and means to operatively connect the link to said disc at various circumferentially spaced points whereby various ranges of feed rates may be selected.

14. In a machine tool having a work support and a tool support, the combination of transmission means for effecting relative movement between said supports including a variable displacement motor for effecting feeding movements at various rates, said variable displacement motor having a prescribed minimum speed, a differential mechanism comprising a pair of co-axial gears and an intermeshing gear, means to couple the motor for actuation of one of said co-axial gears, means to drive the other co-axial gear at a constant speed which is equal to the prescribed minimum speed of the first gear whereby the output speed of the differential may begin at zero.

15. In a transmission and control mechanism for the work support of a machine tool, the combination of a feed transmission, a rapid traverse transmission, means for selectively connecting said transmissions for movement of the table, a variable displacement hydraulic motor for driving the feed transmission, a constant delivery pump for supplying fluid to said motor, a monitoring mechanism for controlling the displacement of said pump for maintaining the output speed of said motor constant under varying load, said mechanism also being adjustable to increase or decrease the rate of said motor, a prime mover, a first branch train for driving the rapid traverse transmission, a second branch train for driving the pump, a third branch train for driving the monitoring mechanism, and means connecting all of said trains for actuation by the prime mover.

16. In a transmission and control mechanism for the work support of a machine tool, the combination of a feed transmission, a rapid traverse transmission, means for selectively connecting said transmissions for movement of the table, a variable displacement hydraulic motor, a first gear driven thereby, a second gear co-axial with the first and rotatable at a constant speed, a third intermeshing gear coupled to the feed transmission, a constant delivery pump for supplying fluid to said motor, a monitoring mechanism for controlling the displacement of said pump and thereby maintaining the output speed of said motor constant under varying load, said mechanism also being adjustable to increase or decrease the rate of said motor, a prime mover, a first branch train for driving the rapid traverse transmission, a second branch train for driving the pump, a third branch train for driving the monitoring mechanism, a fourth branch train for driving said second gear, and means connecting all of said trains for actuation by the prime mover.

17. In a machine tool having a work support and a tool support, the combination of transmission means for effecting relative movement between the supports at different rates including a feed clutch, a rapid traverse clutch, a final motion transmitting train, means to selectively engage said clutches for actuation of the train, a constant speed prime mover for driving the rapid traverse clutch, a variable speed hydraulic transmission for driving the feed clutch, means for varying the speed of said transmission, a drive train from the transmission to the feed clutch, branch trains driven by the prime mover and the drive train respectively and terminating in opposed relation to one another, and means responsive to the speed differential between said branch trains to effect automatic rate adjustment of said hydraulic transmission to eliminate said differential.

18. In a machine tool having a work support and a tool support, the combination of transmission means for effecting relative movement between said supports at rapid traverse and feeding rates including a feed gear and a rapid traverse gear, a constant speed prime mover for driving said rapid traverse gear, a pump and motor connected together in a closed circuit, the displacement of one of which is variable, means to drive the pump from said prime mover, a pair of oppositely rotatable co-axial gears, means operatively connecting one of said gears for rotation by the prime mover in one direction at a constant rate, means operatively connecting the other gear for rotation by said hydraulic motor in the opposite direction at a rate equal to said constant rate when said displacement is set for a minimum rate, a differential gear intermeshing with said pair of gears and operatively connected for rotation of the feed gear, and means to vary said displacement to increase the rate of rotation of the feed gear.

19. In a machine tool having a work support and a tool support, the combination of a variable feed transmission for effecting a relative feeding movement between said supports including a constant displacement pump and a variable displacement motor interconnected in a closed circuit, means to control the displacement of said motor including a pair of interengaging rotatable threaded members, one of which is a monitoring member, power operable means to drive the monitoring member at variable rates, means to drive the other member from the motor, an actuator shiftable in response to variations in the rates of rotation of said members, fluid operable means for varying the displacement of said motor, and control valve means operatively connected to said actuator and shiftable thereby to reversely connect a source of hydraulic pressure to effect opposite adjustment of the displacement varying means for said motor.

20. In a machine tool having a work support and a tool support, the combination of a variable feed transmission for effecting a relative feeding movement between said supports including a constant displacement pump and a variable displacement motor interconnected in a closed circuit, means to control the displacement of said motor including a pair of interengaging rotatable threaded members, one of which is a monitoring member, means to drive the monitoring member at variable rates to determine the relative feeding rate between said supports, means to drive the other member from the motor, an actuator shiftable in response to variations in the rates of rotation of said members, fluid operable means for varying the displacement of said motor, control valve means operatively connected to said actuator and shiftable thereby to reversely connect a source of hydraulic pressure to effect opposite adjustment of the displacement varying means for said motor, and a feed back connection from said motor to said valves.

21. In a milling machine having a work support and a tool support, the combination of a variable hydraulic transmission for effecting relative movement between the supports, means to vary the output of said transmission over a range from a prescribed low speed to a prescribed maximum speed, a differential mechanism, means to drive one leg of said mechanism at a prescribed speed equal to the prescribed constant low speed of said hydraulic transmission, means to drive the other leg of said differential from said hydraulic transmission whereby when said hydraulic transmission is adjusted to its prescribed low speed the output of said differential is zero speed, means to connect said output to a movable support, and means to increase the rate of said hydraulic transmission up to its maximum rate whereby the range of rates of movement of said movable support is equal to the difference between the prescribed minimum speed and the prescribed maximum speed of said hydraulic transmission.

22. In a machine tool having a work support and a tool support, the combination of means for effecting a relative feeding movement between said supports including a hydraulic transmission having an adjustable rate variator to determine the feed rate desired, a feed rate control cam carried by the movable support, a plunger yieldingly held into engagement with said cam, means operatively connecting said plunger with said rate variator to effect adjustment thereof, said connecting means including a link and a crank disc, a bell crank connecting said link to the plunger, said link having a limited movement, and means to operatively connect the link to said disc at various circumferential spaced points whereby various ranges of feed rates may be selected.

23. In a milling machine having a work support and a tool support, the combination of transmission means for effecting relative movement between the supports including a feed clutch, a rapid traverse clutch, a pair of reversing clutches, forward and reverse gearing between said clutches, fluid operable means for shifting said clutches, a source of pressure, a multi-position control valve for selectively connecting pressure to said clutches, said valve having a neutral position for connecting pressure to both of said reversing clutches to lock the movable support against movement, a feed position on one side of said neutral position for connecting pressure to the feed clutch and one of said reversing clutches, a second feed position on the opposite side of said neutral position for engaging the feed clutch and the other of said reversing clutches, a first rapid traverse position on one side of said neutral position and beyond the feed position for effecting engagement of the rapid traverse clutch and one of said reversing clutches, and a second rapid traverse position on the opposite side of said neutral position and beyond said second-named feed position for connecting pressure to the rapid traverse clutch and to the other of said reversing clutches.

24. In a milling machine having a work support and a tool support, the combination of transmission means for effecting relative movement between the supports including a feed clutch, a rapid traverse clutch and a pair of reversing clutches, fluid operable means for shifting said clutches, a multi-position control valve for selectively connecting pressure to said fluid operable means in different combinations, said valve having a neutral position, feed and rapid traverse positions on one side of said neutral position for one direction of movement, feed and rapid traverse positions on the other side of said neutral position for the other direction of movement, a first set of dog-operated plungers operatively connected for automatically shifting the valve between the positions on one side of said neutral position, a second set of plungers for automatically shifting the valve while on the other side of said neutral position, manually operable means for shifting the valve from its neutral position to one of its operative positions to start relative movement between the supports, and means simultaneously operable by the valve to connect pressure to one set of plungers and disconnect pressure from the other whereby only one set of plungers is effective during a given direction of relative movement.

25. In a milling machine having a work support and a tool support, the combination of transmission means for effecting relative movement between the supports including a feed clutch, a rapid traverse clutch and a pair of reversing clutches, fluid operable means for shifting said clutches, a multi-position control valve for selectively connecting pressure to said fluid operable means in different combinations, said valve having a neutral position, a pair of rate positions for one direction of movement on one side of said neutral position, a second pair of rate positions for the other direction of movement on the other side of said neutral position, a first dog-operated means for shifting said valve between one set of rate positions, another dog-operated means for shifting the valve between the other set of rate positions and a third dog-operated means for shifting the valve from either rate position on one side of said neutral position to a rate position on the other side of said neutral position.

26. In a milling machine having a work support and a tool support, the combination of transmission means for effecting relative movement between the supports including a feed clutch, a rapid traverse clutch and a pair of reversing clutches, fluid operable means for shifting said clutches, a multi-position control valve for selectively connecting pressure to said clutches having a neutral position, a pair of rate positions for one direction of movement on one side of said neutral position, a second pair of rate positions for the other direction of movement on the other side of said neutral position, a first dog-operated means for shifting said valve between one set of rate positions, another dog-operated means for shifting the valve between the other set of rate positions, a third dog-operated means for shifting the valve from either of its rate positions on one side of said neutral position to a rate position on the other side of said neutral position, and either of said first two-mentioned dog-operated means also being effective to shift the valve from either of its rate positions to a stop position.

27. In a milling machine having a work support and a tool support, the combination of transmission means for effecting relative movement between the supports including a feed clutch, a rapid traverse clutch and a pair of reversing clutches, fluid operable means for controlling the shifting of said clutches including a first set of dog-operated plungers for controlling the shifting of the feed and rapid traverse clutches, a second set of dog-operated plungers for controlling the shifting of the feed and rapid traverse clutches, means for determining the direction of movement of the support and simultaneously selectively connecting pressure to one or the other of said sets of plungers whereby the trip dogs that control the rate changes in one direction are ineffective during the other direction of support movement.

28. In a milling machine having a work support and a tool support, the combination of transmission means for effecting relative movement between the supports including feed and rapid traverse clutches, a pair of reversing clutches, means to control the shifting of said clutches including a multi-position control valve having a neutral position and operative positions on opposite sides thereof, manual means for positioning said valve in one of said operative positions, a pair of dog-operated reversing plungers, means effective upon operation of one of said plungers to effect disengagement of the feed and rapid traverse clutches, engagement of both of said reversing clutches to brake the slide movement and subsequently effect engagement of the feed clutch and one of said reversing clutches.

29. In a machine tool having a work support and a tool support, the combination of transmission means for effecting relative movement between the supports including a variable displacement hydraulic motor having a displacement regulator, means coupling the motor for effecting said relative movement at variable feed rates in accordance with the position of said regulator, means to control the position of said regulator including a pair of interengaging rotatably threaded members, one of which is a monitoring member, means to drive the monitoring member at variable rates, means to drive the other member from said motor, and means including a lever movable in response to variations in the rates of rotation of said members to adjust said regulator in a manner to cause the rate of the motor to conform to the rate of the monitoring member and a feed back connection from the regulator to said lever to modify the adjustment thereof.

30. In a machine tool having a work support and a tool support, the combination of means for effecting a relative feeding movement between said supports at variable rates including a variable displacement feed motor, a displacement regulator therefor, a motion transmitting train coupling the motor to the movable support, means to control the displacement of said motor including interthreaded screw and nut members, means to connect one of said members for rotation by the motor, a monitoring mechanism for driving the other member in the same direction whereby when the speeds are equal no relative bodily movement will take place between said threaded members, means to increase or decrease the speed of the monitoring member, and actuating means responsive to ensuing bodily movement between said threaded members to adjust said displacement regulator to increase or decrease the motor rate until the motor speed matches the speed of the monitoring mechanism, and a feed back connection from said regulator to said actuating means to modify the effect of the latter.

31. In a milling machine having a work support and a tool support, the combination of a variable hydraulic transmission for effecting relative movement between the supports, means to vary the output of said transmission over a range from a prescribed low speed to a prescribed maximum speed, a differential mechanism, means to drive one leg of said mechanism at a prescribed constant speed equal to the prescribed low speed of said hydraulic transmission, means to drive the other leg of said differential from said hydraulic transmission whereby when said hydraulic transmission is adjusted to its prescribed low speed the output of said differential is zero speed, means to adjust said transmission above its prescribed low speed to obtain low operating speeds of high torque, means to connect the output of said hydraulic transmission to the feed side of a feed rapid traverse clutch, a rapid traverse transmission for actuating the rapid traverse side of said clutch, and a pair of gears adapted to be oppositely driven by said clutch at either a feed rate or a rapid traverse rate, and means to selectively connect said last-named gears for opposite directions of actuations of one of said supports.

ERWIN G. ROEHM.
HANS FRITSCHI.

REFERENCES CITED

The following references are of record in the file of this patent:

UNITED STATES PATENTS

| Number | Name | Date |
|---|---|---|
| 1,598,202 | La Ducer | Aug. 31, 1926 |
| 1,749,073 | Graves | Mar. 4, 1930 |
| 2,069,230 | Ferris | Feb. 2, 1937 |
| 2,072,540 | Wright | Mar. 2, 1937 |
| 2,082,140 | Bennett et al. | June 1, 1937 |
| 2,170,291 | Martellotti | Aug. 22, 1939 |
| 2,204,693 | Parsons | June 18, 1940 |
| 2,215,684 | Armitage | Sept. 24, 1940 |
| 2,217,671 | Coffin et al. | Oct. 15, 1940 |
| 2,224,106 | Ridgway | Dec. 3, 1940 |
| 2,235,085 | Roehm et al. | Mar. 18, 1941 |
| 2,308,688 | Hassman | Jan. 19, 1943 |
| 2,331,218 | Montelius | Oct. 5, 1943 |
| 2,356,796 | Purvin | Aug. 29, 1944 |